US008848885B2

(12) United States Patent
Numano

(10) Patent No.: US 8,848,885 B2
(45) Date of Patent: Sep. 30, 2014

(54) DEVICE INFORMATION COMMUNICATION METHOD, VIDEO DISPLAY DEVICE, AND VIDEO DISPLAY SYSTEM

(75) Inventor: Fujihito Numano, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 433 days.

(21) Appl. No.: 13/278,967

(22) Filed: Oct. 21, 2011

(65) Prior Publication Data

US 2012/0162353 A1 Jun. 28, 2012

(30) Foreign Application Priority Data

Dec. 27, 2010 (JP) ................................. 2010-289926

(51) Int. Cl.
*H04M 11/00* (2006.01)
(52) U.S. Cl.
USPC ..................................... 379/93.17; 379/201.1
(58) Field of Classification Search
USPC ............... 348/14.04; 379/201.1, 93.09, 93.17
See application file for complete search history.

(56) References Cited

U.S. PATENT DOCUMENTS

| 8,369,498 | B2 * | 2/2013 | Dinka et al. ................ 379/93.21 |
| 8,619,953 | B2 * | 12/2013 | Nietfeld et al. ............ 379/93.21 |
| 2007/0097964 | A1 | 5/2007 | Kashimoto |
| 2008/0075247 | A1 | 3/2008 | Tanaka et al. |
| 2011/0035773 | A1 * | 2/2011 | Stecyk et al. .................... 725/38 |
| 2011/0242270 | A1 * | 10/2011 | Dinka et al. ............... 348/14.11 |
| 2012/0136942 | A1 * | 5/2012 | Amidon et al. ............... 709/206 |

FOREIGN PATENT DOCUMENTS

| JP | 2003-219287 | 7/2003 |
| JP | 2004248086 | 9/2004 |
| JP | 2006217269 | 8/2006 |
| JP | 2006-287395 | 10/2006 |
| JP | 2007129323 | 5/2007 |
| JP | 2008066985 | 3/2008 |
| JP | 2008085509 | 4/2008 |
| JP | 2008294564 | 12/2008 |

OTHER PUBLICATIONS

Japanese Patent Application No. 2010-289926, Notice of Rejection, mailed Dec. 20, 2011, (with English Translation).
Japanese Patent Application No. 2010-289926, Decision of Rejection, mailed May 15, 2012, (with English Translation).

* cited by examiner

*Primary Examiner* — Olisa Anwah
(74) *Attorney, Agent, or Firm* — Blakely, Sokoloff, Taylor & Zafman LLP

(57) ABSTRACT

According to one embodiment, a device information communication method applied to a video display device, includes: obtaining device information on a device being connected to the video display device; controlling an outgoing call to a communication partner and an incoming call from the communication partner; and sending the device information to the communication partner.

13 Claims, 6 Drawing Sheets

DEVICE INFORMATION COMMUNICATION METHOD, VIDEO DISPLAY DEVICE, AND VIDEO DISPLAY SYSTEM

CROSS-REFERENCE TO RELATED APPLICATIONS

This application is based upon and claims the benefit of priority from Japanese Patent Application No. 2010-289926, filed Dec. 27, 2010, the entire contents of which are incorporated herein by reference.

FIELD

Embodiments described herein relate generally to a device information communication method, a video display device and a video display system.

BACKGROUND

In recent years, there has been increasingly widespread use of terminals such as broadcast receivers having a call function. Such a call function enables a broadcast receiver to make a call to another broadcast receiver, a mobile terminal, an information processor, and the like.

With this conventional technology, it is difficult to determine whether the other side of a call is in an environment not suitable for confidential communication. Accordingly, a third a party may listen to or view the communication depending on the type of the output device.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, there is provided a device information communication method applied to a video display device. The device information communication method comprises: obtaining device information on a device being connected to the video display device; controlling an outgoing call to a communication partner and an incoming call from the communication partner; and sending the device information to the communication partner.

Figure 1:
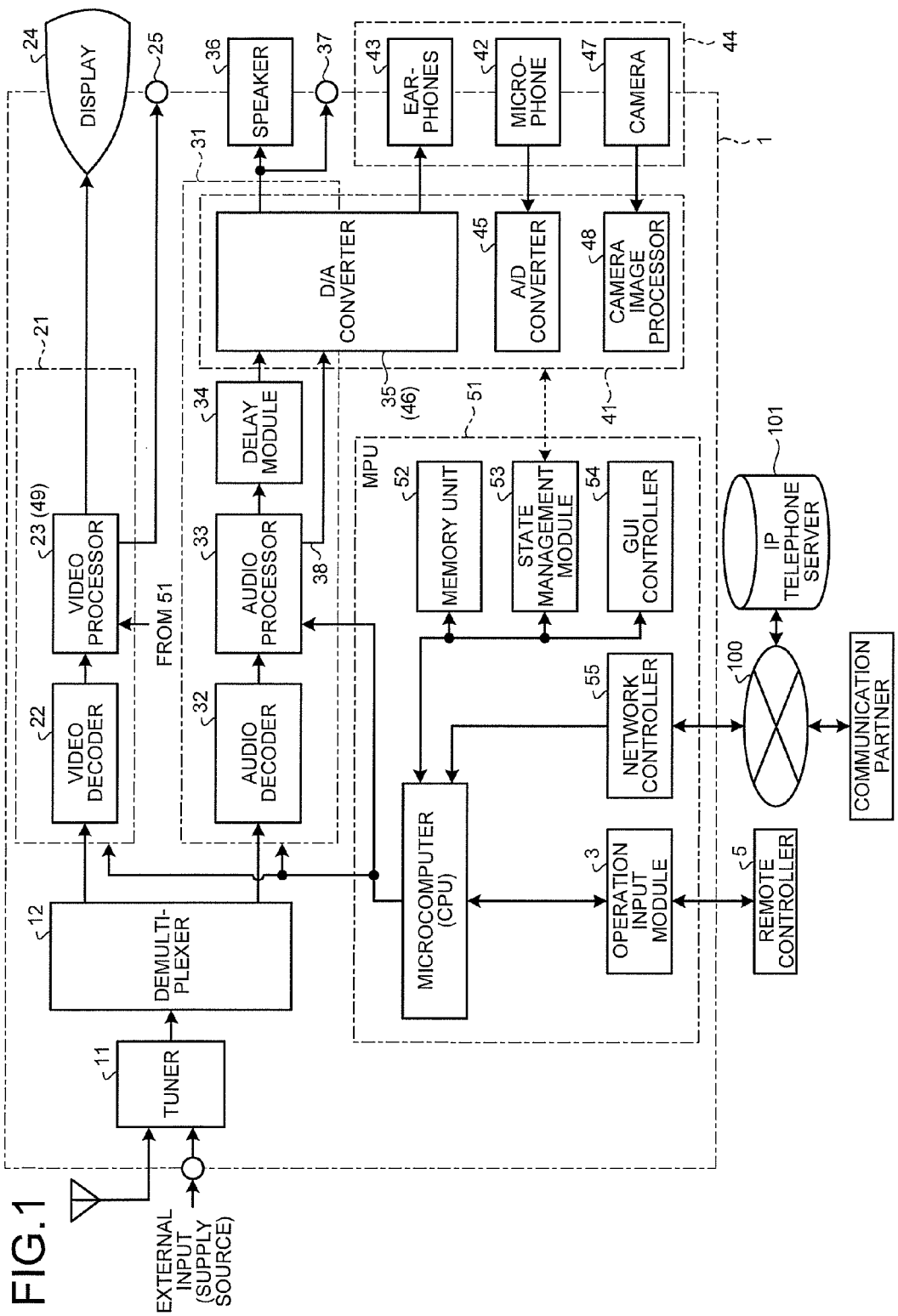
FIG. 1 is an exemplary diagram of a video display device and a communication device built in the video display device according to an embodiment.

Exemplary embodiments will be described in detail below with reference to the accompanying drawings. FIG. 1 illustrates an example of a video display device and a communication device built in the video display device according to an embodiment. Elements, configurations, and functions described below may be implemented by hardware, or may be implemented by software with a microcomputer (a processor, a central processing unit) or the like.

The video display device illustrated in FIG. 1 comprises a television (TV) broadcast receiver (hereinafter, "TV receiver") 1 that receives, for example, a TV broadcast and reproduces audio and video.

The TV receiver 1 (video display device) is capable of at least receiving a digital TV broadcast program, i.e., content, and reproducing it. The TV receiver 1 can receive content distributed via a network (the Internet) 100. The TV receiver 1 can use an Internet protocol (IP) telephone capable of audio and video communication according to an Internet protocol with a device connected via the Internet 100.

In the TV receiver 1, a tuner 11 receives content (a program), and a demultiplexer 12 demultiplexes the content into video data and audio data.

The video data output from the demultiplexer 12 is decoded by a video decoder 22 in a video processing block 21 and is output as a digital video signal.

The video data decoded by the video decoder 22 is input to a video processor 23 that processes the data to be displayable on the video display device. The video processor 23 converts the video data to a predetermined resolution and an output system such as interlace (i)/non-interlace (p) to be displayable on a display 24 at the later stage, and outputs it to the display 24. The output of the video processor 23 may be input to an output terminal 25 to which, for example, an external monitor or a projector can be connected.

The audio data output from the demultiplexer 12 is decoded by an audio decoder 32 in an audio processing block 31 and is output as a digital audio signal.

The audio signal obtained by the audio decoder 32 is input to an audio processor 33 that processes the signal to be reproducible by the audio output device. The audio signal is then input to a delay module 34 that imparts a predetermined delay to the signal (delays the audio output) to temporally match the output of the audio processor 33 and the video signal output from the video processor 23. After that, the audio signal is input to a digital-to-audio (D/A) converter 35 to obtain analog audio output.

The analog audio output from the D/A converter 35 is input to, for example, a speaker 36 such as a loudspeaker. The output from the D/A converter 35 may also be input to an output terminal 37 to which an audio-visual (AV) amplifier can be connected.

The audio signal delayed by a predetermined time by the delay module 34 is also input to an IP telephone controller 41. The IP telephone controller 41 is connectable to a communication set 44 comprising, for example, an audio input module 42 (microphone) and an audio player 43 (earphones or a low audio output speaker). The IP telephone controller 41 comprises an audio-to-digital (A/D) converter 45 and a D/A converter 46. The A/D converter 45 performs A/D conversion on input from the audio input module 42, while the D/A converter 46 performs D/A conversion on output to the audio player 43. Incidentally, the D/A converter 46 that performs D/A conversion on output to the audio player 43 also serves as the D/A converter 35 in the audio processing block 31.

The IP telephone controller 41 may be provided with a camera 47 that captures an image of the user and the like and a camera image processor 48. The IP telephone controller 41 may also be provided with an image processor 49 that reproduces an image received from the other side of communication (a communication partner).

The image processor 49 can reproduce video including still images such as those of joint photographic experts group (JPEG) as well as moving image such as those of moving picture expert group (MPEG)-2 and MPEG-4 (H.264/AVC). Incidentally, the image processor 49 that reproduces video also serves as the video processor 23 in the video processing block 21.

In the TV receiver 1 (video display device), the tuner 11, the demultiplexer 12, the video processing block 21, the audio processing block 31, and the IP telephone controller 41 each performs predetermined processing under the control of a main control block 51.

The main control block 51 such as a main processing unit or a microprocessing unit (MPU) comprises, for example, a central processing unit (CPU) or a microcomputer. The main control block 51 (MPU) comprises a memory unit 52, a state management module 53, a graphical user interface (GUI) controller 54, and a network controller 55. The memory unit 52 comprises at least a read only memory (ROM) that stores an operation program and a random access memory (RAM) that functions as a work memory. The state management module 53 manages an incoming call via the Internet to the IP telephone controller 41 and an outgoing call from the IP telephone controller 41. The GUI controller 54 controls GUI to be displayed on the display 24 and user input from GUI. The network controller 55 controls connection to the Internet 100, i.e., acquisition of various types of information from the Internet 100, user access to the Internet 100, and the like.

To the main control block 51 (MPU) is connected an operation input module 3 that receives control input from the user.

The operation input module 3 comprises at least a receiver that receives an instruction or control input from a channel key (button) to specify a channel to be selected by the tuner 11 (input module), a power switch to turn power on/off, and a remote controller 5. A key operation input device such as a keyboard may be connected to the operation input module 3 to enable input of letters, characters, numbers, and the like.

The IP telephone controller 41 can packetize the voice of the user obtained from the audio input module 42 (microphone) in the communication set 44 according to firmware of the main control block 51 (MPU) or an IP telephone program according to a program prepared in advance such as, for example, an Internet telephone "Skype" provided by Skype Technologies S.A. and send it to a communication partner connected via a network such as the Internet. If provided with the camera 47, the IP telephone controller 41 can packetize an image of the user and send it to the communication partner together with the voice.

Figure 2:
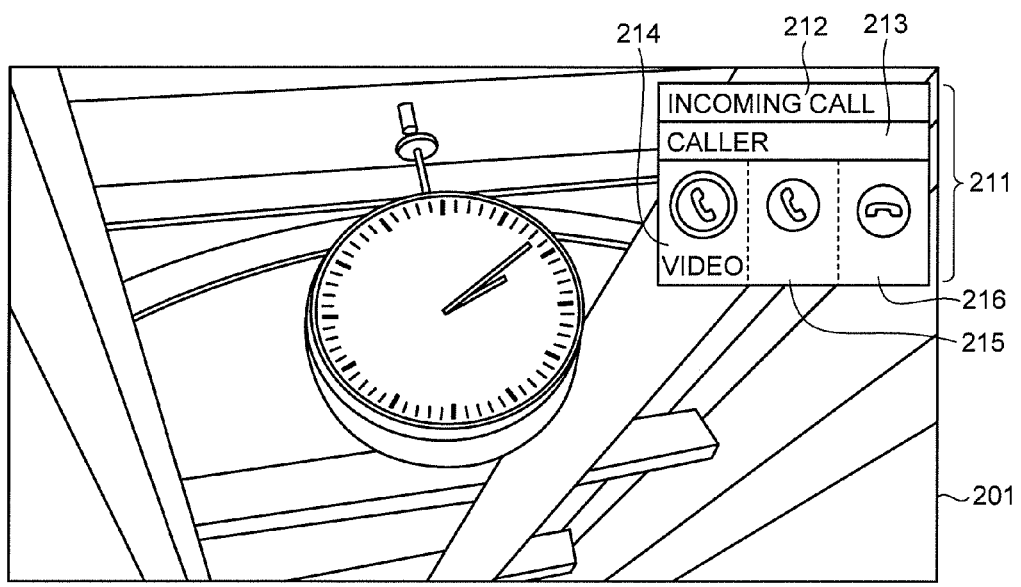
FIG. 2 is an exemplary diagram of a screen of call function displayed on the video display device in the embodiment.

If the user receives an IP telephone call via the Internet 100 while viewing a program (content) on the TV receiver 1, as illustrated in FIG. 2, an incoming call display 211 is displayed by the GUI controller 54 at a position (on the upper right in the example of FIG. 2) in a video display 201 of the program.

The incoming call display 211 includes an incoming call 212 indicating the receipt of an incoming call, a caller 213 indicating the caller of the incoming call, a first response display 214, a second response display 215, and a third response display 216 indicating how to respond to the incoming call. The first response display 214 indicates a response with video. The second response display 215 indicates a response by only voice. The third response display 216 indicates no response. With this, the user can select whether to respond the incoming call or not and how to respond by, for example, moving a cursor with the remote controller 5.

Figure 3:
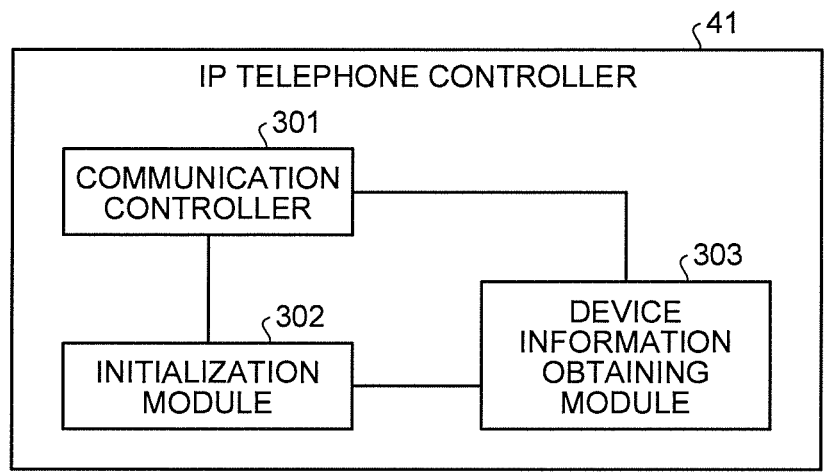
FIG. 3 is an exemplary functional block diagram of an Internet protocol (IP) telephone controller in the embodiment.

The IP telephone controller 41 will be described in detail below. FIG. 3 is a functional block diagram of the IP telephone controller 41. As illustrated in FIG. 3, the IP telephone controller 41 comprises a communication controller 301, an initialization module 302, and a device information obtaining module 303.

The initialization module 302 initializes a device connected to the TV receiver 1 when the call function is activated. Examples of a device to be connected to the TV receiver 1 include an audio input/output device such as a loudspeaker, an array microphone, and a headset comprising earphones and a microphone, an image capturing device such as a camera, and a display device such as a liquid crystal display (LCD).

The initialization process performed by the initialization module 302 includes sound adjustment for the audio input/output device, image quality processing for the image capturing device, and the like. For example, if a loudspeaker is being connected to the TV receiver 1, noise as well as sound is loud. Accordingly, the initialization module 302 eliminates the noise as the initialization process at the time of audio output. If an array microphone is being connected to the TV receiver 1, the initialization module 302 removes sound except front sound (beamforming) as the initialization process to input only the voice of the user in front of the TV receiver 1.

The device information obtaining module 303 is called and activated by the initialization module 302 and obtains information on a device being connected to the TV receiver 1, i.e., identification information (ID) and setting information of the connected device. Examples of the connected device include an audio input/output device that can be used by a plurality of users such as a loudspeaker and an array microphone, an audio input/output device for personal use such as a headset comprising earphones and a microphone, an image capturing device such as a camera, and a display device such as LCD. The device information obtaining module 303 obtains the ID and setting information of such a device.

The setting information of a device connected to the TV receiver 1 may be, for example, the screen size of a display device such as LCD (32 inches, 42 inches, etc.), ON/OFF of an image capturing device such as a camera, and the like. In this manner, the device information obtaining module 303 performs the process of obtaining the ID and setting information of a device when the initialization module 302 performs the existing initialization process. Accordingly, it is not necessary to newly add the process as the one unique to the embodiment. This prevents an increase in the development man-hour of the TV receiver 1 of the embodiment.

The ID and setting information of a device is information shared with an IP telephone server 101 and a communication partner device. The IP telephone server 101 stores icons corresponding to the ID and setting information of each device.

The device information obtaining module 303 may be configured to distinguish between a device that can be used by a plurality of users such as a loudspeaker and an array microphone and a device for personal use such as a headset to obtain the ID and setting information of the device instead of obtaining those of each device. With this configuration, the communication partner can also recognize whether a device connected to the TV receiver 1 is the one that can be used by a plurality of users or the one for personal use such as a headset.

Thus, the communication partner can determine whether the TV receiver 1 is in an environment suitable for confidential communication.

If there is any change in a device connected to the TV receiver 1 during a call with a communication partner, for example, if a device is connected/disconnected or the setting information is changed, the device information obtaining module 303 detects the change by the receipt of the event. Thus, the device information obtaining module 303 obtains the ID and setting information of a device after the change. For example, if a headset is disconnected during a call and a loudspeaker and an array microphone are connected instead, the device information obtaining module 303 detects the change by the receipt of the event and obtains the ID of the loudspeaker and the array microphone newly connected to the TV receiver 1.

For another example, if a camera is newly connected during a call, the device information obtaining module 303 detects the new connection by the receipt of the event and obtains the ID of the camera newly connected to the TV receiver 1. If the camera connected to the TV receiver 1 is OFF and is turned on by the user during a call, the device information obtaining module 303 detects the change from OFF to ON in the setting information by the receipt of the event and obtains the setting information indicating the camera is ON.

The communication controller 301 controls an outgoing call to a communication partner as well as an incoming call from a communication partner. When making a call to a communication partner, the communication controller 301 sends the communication partner the ID and setting information of a device obtained by the device information obtaining module 303. If the device information obtaining module 303 obtains the ID of a newly connected device or changed setting information, the communication controller 301 sends the ID of the newly connected device or the changed setting information to the communication partner.

A detailed description will be given of a communication partner device to which the user of the TV receiver 1 makes a call. In the embodiment, while the communication partner will be described as an information processor such as a personal computer (PC), this is by way of example and not of limitation. The communication partner may be any device having communication function such as a mobile terminal and a TV receiver.

Figure 4:
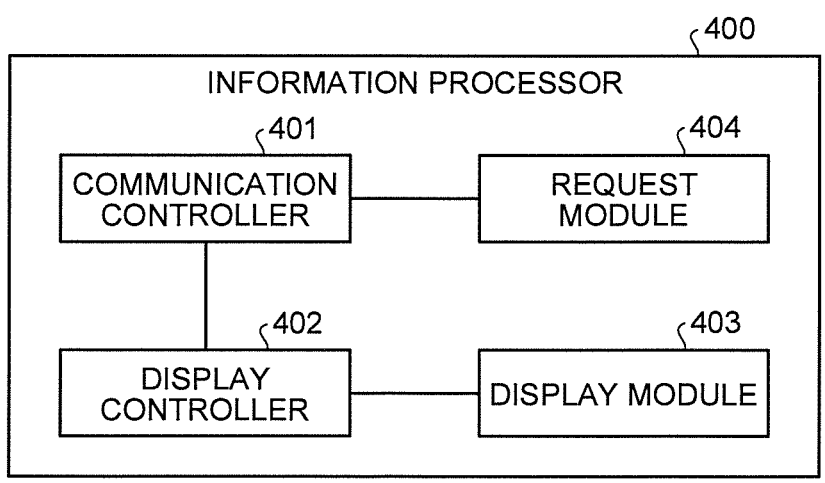
FIG. 4 is an exemplary functional block diagram of an information processor of a communication partner in the embodiment.

FIG. 4 is a functional block diagram of an information processor 400 of a communication partner. As illustrated in FIG. 4, the information processor 400 comprises a communication controller 401, a display controller 402, a display module 403, and a request module 404. The information processor 400 has a general hardware configuration of a computer comprising a CPU, a storage device such as a memory and a hard disk drive (HDD), an input device such as a keyboard and a mouse, and the display module 403 such as LCD.

The communication controller 401 controls an outgoing call to a communication partner as well as an incoming call from a communication partner. The communication controller 401 receives the ID and setting information of a device connected to the TV receiver 1 as a communication partner. Further, the communication controller 401 controls communication with the IP telephone server 101 connected via the Internet 100.

The request module 404 requests the IP telephone server 101 via the communication controller 401 for an icon corresponding to the ID of the device received by the communication controller 401. The communication controller 401 receives the requested icon from the IP telephone server 101.

The display module 403 is a display device such as, for example, LCD. The display controller 402 controls the display of various screens on the display module 403. In the embodiment, the screen of call function such as Skype function is displayed on the display module 403. Besides, icons corresponding to the ID and setting information of a device received from the IP telephone server 101 are displayed on the screen of call function as presence information indicating the current status of a caller such as "online", "offline", "not available", and the like.

Figure 5:
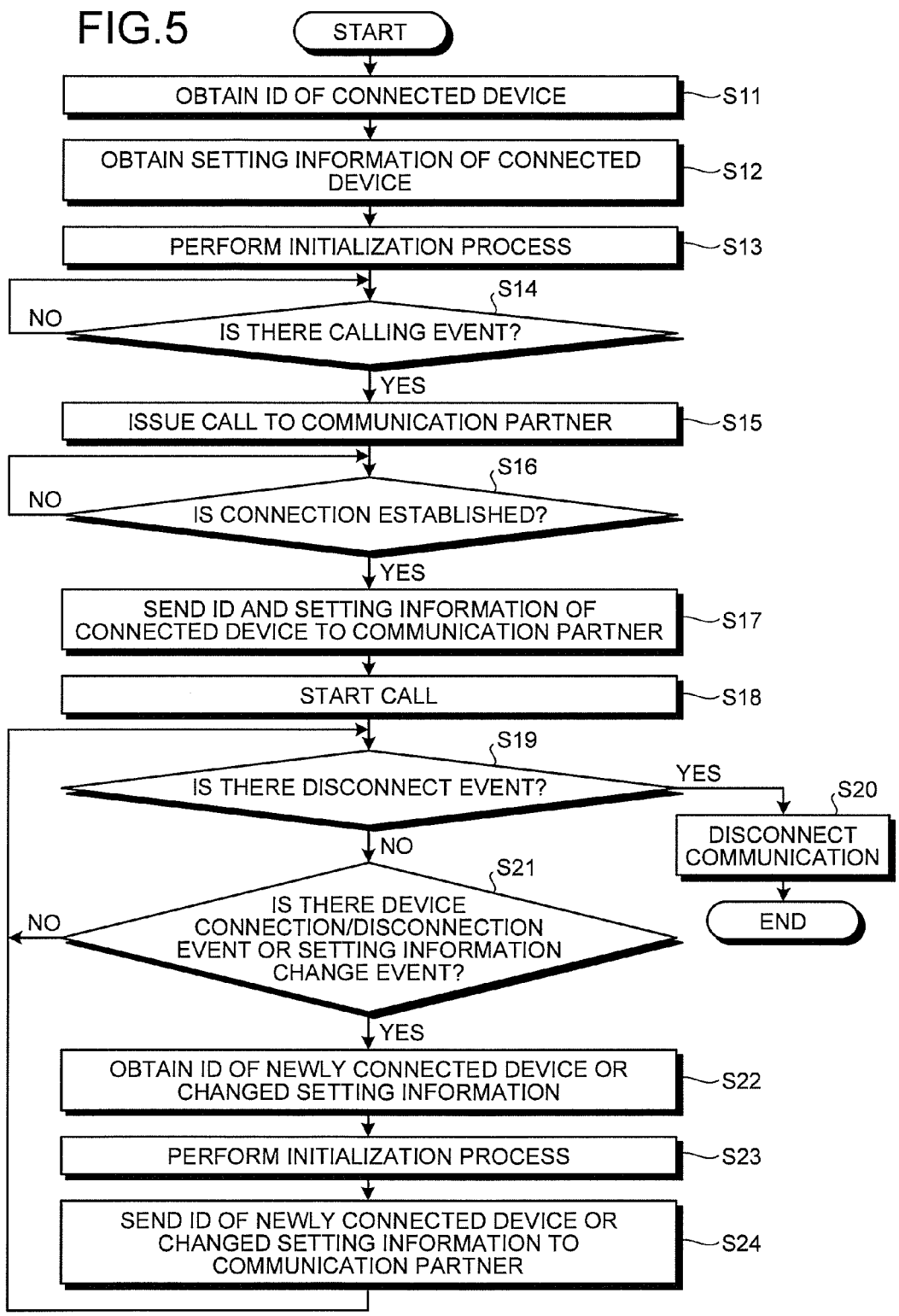
FIG. 5 is an exemplary flowchart of a device information communication process in the embodiment.

In the following, a description will be given of a device information communication process performed by the TV receiver 1 of the embodiment configured as above. FIG. 5 is a flowchart of the device information communication process according to the embodiment.

When a call function such as Skype is activated on the TV receiver 1, the initialization module 302 calls the device information obtaining module 303 to perform the initialization process. The device information obtaining module 303 obtains ID of a device (connected device) being connected to the TV receiver 1 (S11). The device information obtaining module 303 then obtains the setting information of the connected device (S12). The initialization module 302 performs the initialization process such as sound adjustment on the connected device (S13).

Thereafter, the communication controller 301 determines whether there is calling operation by the user, i.e., a calling event (S14). If not (No at S14), the communication controller 301 waits for a calling event. Having detected a calling event (Yes at S14), the communication controller 301 issues a call to a communication partner specified by the calling operation (S15). After that, the communication controller 301 waits for the establishment of a connection to the communication partner (No at S16).

Once a connection to the communication partner is established (Yes at S16), the communication controller 301 sends the ID of the connected device obtained at S11 and the setting information of the connected device obtained at S12 to the communication partner (S17). By sending the ID and the setting information to the Skype network, the information is send to other devices than the communication partner. The TV receiver 1 starts a call with the communication partner (S18).

The communication controller 301 waits for the receipt of a disconnect event during the call (S19). Upon receipt of a disconnect event (Yes at S19), the communication controller 301 disconnects communication with the communication partner (S20), and the process ends.

On the other hand, if receiving no disconnect event (No at S19), the communication controller 301 determines whether there is a device connection/disconnection event or a setting information change event regarding the connected device (S21). If there is no such an event (No at S21), the process returns to S19, and the communication controller 301 waits for the receipt of a disconnect event.

On the other hand, if there is a device connection/disconnection event or a setting information change event regarding the connected device (Yes at S21), the device information obtaining module 303 obtains the ID of a device newly connected to the TV receiver 1 or changed setting information depending on the event (S22).

The initialization module 302 performs the initialization process on the newly connected device or the connected device whose setting information has been changed (S23). Next, the communication controller 301 sends the ID of the newly connected device or the changed setting information to the communication partner (S24). Then, the process returns to S19, and the communication controller 301 waits for the receipt of a disconnect event.

As described above, if a device is connected/disconnected or setting information of the connected device is changed during a call, the communication partner is notified of the event at the time it occurs.

Figure 6:
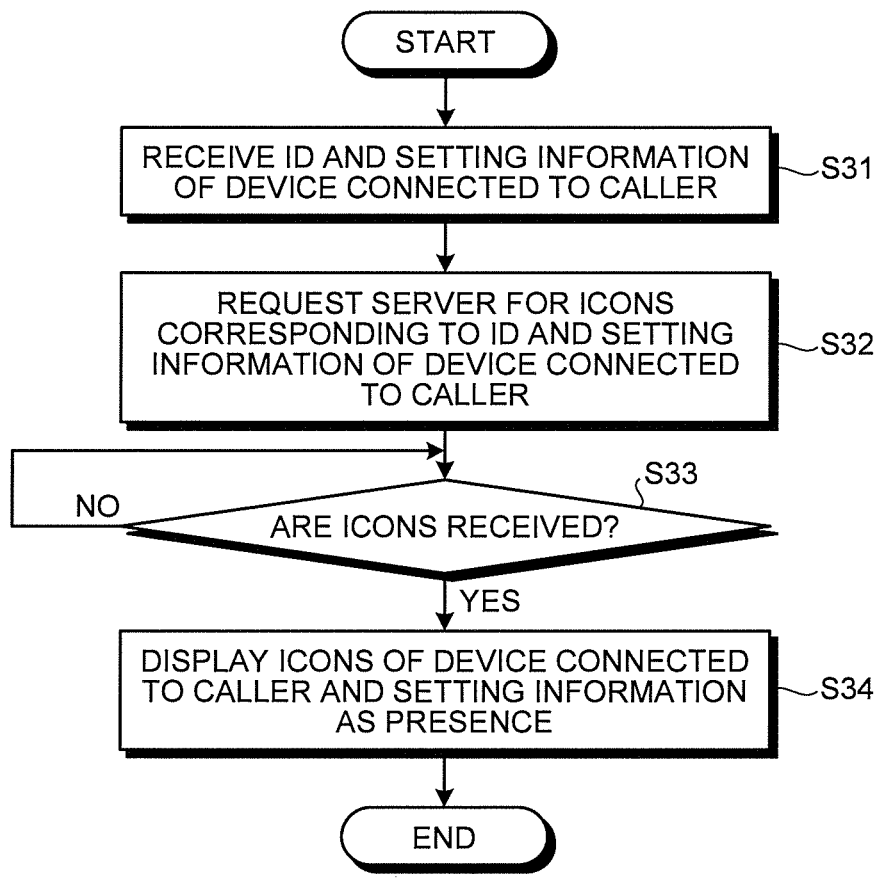
FIG. 6 is an exemplary flowchart of a display process performed by the information processor in the embodiment.

In the following, a description will be given of a display process performed by the information processor 400 of the communication partner that receives the ID and setting information of a connected device. FIG. 6 is a flowchart of the display process performed by the information processor 400 according to the embodiment.

The communication controller 401 of the information processor 400 receives the ID and setting information of the connected device sent thereto from the TV receiver 1 of a caller at S17 or S24 in FIG. 5 (S31).

The request module 404 requests the IP telephone server 101 for icons corresponding to the ID and setting information of the connected device (S32). The communication controller 401 waits for the receipt of icons from the IP telephone server 101 (No at S33).

Upon receipt of icons corresponding to the ID and setting information of the connected device from the IP telephone server 101 (Yes at S33), the display controller 402 displays the icons of the device connected to the TV receiver 1 of the caller and the setting information as presence information on a screen of call function of the display module 403 (S34).

Figure 7:
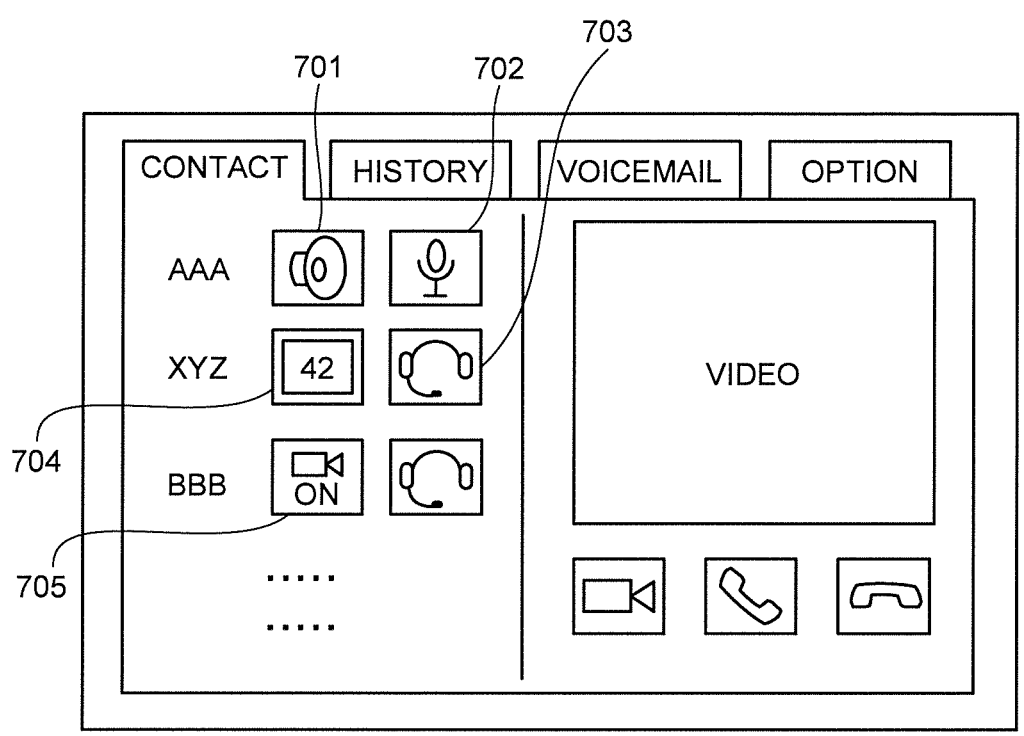
FIG. 7 is an exemplary diagram of a screen of call function displayed on a display module in the embodiment.

FIG. 7 illustrates an example of the screen of call function displayed on the display module 403. In the example of FIG. 7, an icon 701 of a loudspeaker and an icon 702 of an array microphone are displayed as presence information for a user "AAA". Accordingly, during a call with the user "AAA", the user of the information processor 400 recognizes that a loudspeaker and an array microphone that can be used by a plurality of users are connected to the TV receiver 1 of the user "AAA" and that the user "AAA" is in an environment not suitable for confidential communication. Thus, the user of the information processor 400 can take care not to mention confidential information during the call with the user "AAA".

In the example of FIG. 7, icons 703 and 704 are displayed as presence information for a user "XYZ" indicating that a headset for personal use is connected to the TV receiver 1 but the display device has a large 42-inch screen. Such a large screen can be easily viewed by a plurality of users, and thereby it can be recognized that the user "XYZ" is in a low confidential environment. Thus, the user of the information processor 400 can take care not to capture confidential information around him/her during a video call with the user "XYZ". Meanwhile, an icon 705 is displayed as presence information for a user "BBB" indicating that a camera is connected to the TV receiver 1 and is ON. Thus, the user of the information processor 400 can take care not to capture confidential information around him/her.

Further, if, during a call, a device connected to the TV receiver 1 is switched from the one for personal use to the one that can be used by a plurality of users, or if setting information is changed to indicate a setting that allows use by a plurality of users, for example, the setting information of a camera is changed from OFF to ON, an icon displayed as presence information on the screen of the call function of the information processor 400 is changed to the one corresponding to a newly connected device or changed setting information. Thus, if the environment of a communication partner changes to a low confidential level, the user of the information processor 400 can take care not to mention confidential information or not to capture confidential information.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A device information communication method applied to a video display device, comprising:
   obtaining device information on a device being connected to the video display device;
   controlling an outgoing call to a communication partner and an incoming call from the communication partner; and
   sending the device information to the communication partner.

2. The device information communication method of claim 1, wherein the sending includes sending the device information to the communication partner when an outgoing call is made to the communication partner.

3. The device information communication method of claim 1, wherein
   the obtaining includes obtaining, if there is a change in the device information during a call with the communication partner, changed device information, and
   the sending includes sending the changed device information to the communication partner during the call with the communication partner.

4. The device information communication method of claim 1, further comprising initializing the device being connected to the video display device, wherein
   the obtaining includes obtaining the device information at time of the initializing.

5. The device information communication method of claim 1, wherein the obtaining includes distinguishing between a device that can be used by a plurality of users and a device for personal use to obtain the device information.

6. The device information communication method of claim 1, wherein the device information is setting information of the device.

7. A video display device comprising:
   an obtaining module configured to obtain device information on a device being connected to the video display device; and
   a communication controller configured to control an outgoing call to a communication partner and an incoming call from the communication partner, and to send the device information to the communication partner.

8. The video display device of claim 7, wherein the communication controller is configured to send the device information to the communication partner when an outgoing call is made to the communication partner.

9. The video display device of claim 7, wherein
the obtaining module is configured to obtain, if there is a change in the device information during a call with the communication partner, changed device information, and
the communication controller is configured to send the changed device information to the communication partner during the call with the communication partner.

10. The video display device of claim 7, further comprising an initialization module configured to initialize the device being connected to the video display device, wherein
the obtaining module is configured to obtain the device information when the initialization module initializes the device.

11. The video display device of claim 7, wherein the obtaining module is configured to distinguish between a device that can be used by a plurality of users and a device for personal use to obtain the device information.

12. The video display device of claim 7, wherein the device information is setting information of the device.

13. A video display system comprising:
a video display device; and
an information processor connected to the video display device, wherein
the video display device comprising
an obtaining module configured to obtain device information on a device being connected to the video display device, and
a communication controller configured to control an outgoing call to the information processor as a communication partner and an incoming call from the information processor, and to send the device information to the communication partner, and
the information processor comprising
a receiver configured to receive the device information, and
a display module configured to display an icon corresponding to the device information to indicate a status of a caller.

* * * * *